United States Patent [19]

Clark, IV

[11] Patent Number: 5,522,346

[45] Date of Patent: Jun. 4, 1996

[54] LOW TOGGLE FORCE POULTRY WATERING VALVE

[76] Inventor: Reuben B. Clark, IV, 280 Winthrop Rd., Berwyn, Pa. 19312

[21] Appl. No.: 159,338

[22] Filed: Oct. 14, 1993

[51] Int. Cl.⁶ .......................... A01K 7/02; A01K 39/02; F16K 21/16
[52] U.S. Cl. .................................. 119/725; 251/339
[58] Field of Search ................ 119/72.5, 72; 251/120, 251/125, 339

[56] References Cited

U.S. PATENT DOCUMENTS

| | | | |
|---|---|---|---|
| 1,746,727 | 2/1930 | Dunlap | 251/339 |
| 3,416,499 | 12/1968 | Wilmot | 119/72.5 |
| 4,890,578 | 1/1990 | Rader | 119/72.5 |
| 5,193,485 | 3/1993 | Hostetler | 119/72.5 |
| 5,301,635 | 4/1994 | Rovira Badia et al. | 119/72.5 |

FOREIGN PATENT DOCUMENTS 3802918  8/1988  Germany ............................. 119/72.5

*Primary Examiner*—Todd E. Manahan

[57] ABSTRACT

A low toggle force poultry watering valve includes a body having a passageway therethrough within inlet and outlet ends. A step is within the passageway. Two cylindrical regions of differing diameter define the passageway upstream of the step with the region of lesser diameter being closer to the step and facing a passageway inlet. A ball for closing the valve rests against a seat defined by the region of transition between the cylindrical areas of differing diameter. A valve operating stem displaces the ball from contact with the seat and thereby opens the valve upon displacement of the stem by poultry.

7 Claims, 9 Drawing Sheets

LOW TOGGLE FORCE POULTRY WATERING VALVE

FIELD OF THE INVENTION

This invention relates generally to poultry watering and specifically to poultry-actuated watering valves.

BACKGROUND OF THE INVENTION

Poultry has long been grown in enclosed areas within which the birds are supplied with food and water. The close confinement of the birds sometimes leads to conditions in which disease can propagate. As a result, in recent years poultry growers have increasingly supplied preventive medication to poultry by including such medication in dissolved form in water supplied to the birds for drinking.

Poultry watering is a well-developed art. Nevertheless, with increasing use of medication and other additives in the poultry drinking water, the poultry watering valves (which are sometimes referred to as "nipples") tend to foul or clog, which causes the valves to leak unacceptably and/or become completely inoperative. Further, when the rubber sealing gaskets used in prior art poultry watering devices absorb the water/additive mixture, the sealing gaskets change shape and thereby adversely affect the performance of the watering device. In either case maintenance is required and, if a valve becomes so fouled that it will not open, one or more birds depending on that valve for water may die.

In addressing such problems the industry has developed valves, particularly ball valves, which are of all metal construction in order to minimize the risk of fouling created by the presence of medication or other additives in the poultry water. Typical of such ball valves are the valves shown in U.S. Pat. Nos. 4,491,088; 4,525,724; 4,610,221; and 4,984,537. Two patents showing valves or nipples developed specifically to address the fouling problem are U.S. Pat. Nos. 4,606,301 and 4,660,509.

While valves constructed according to the disclosures of U.S. Pat. No. 4,606,301 and 4,660,509 have experienced some acceptance in the marketplace, a continuing problem with poultry watering valves, specifically with poultry-actuated watering valves, is the relatively high force required for the bird to "toggle" or open the valve. The all metal valve constructions disclosed in the prior art require relatively high toggle forces to actuate the valve. Young birds or birds which have been debeaked may not be able to exert the high toggle force necessary to open prior art valves in order to drink.

Other United States patents known to Applicant and which may be material respecting this invention are U.S. Pat. Nos. 1,454,284; 2,710,594; 2,851,007; 3,476,088; 3,675,627; 3,756,199; 4,284,036; 4,402,343; 4,421,060; 4,589,373; 4,637,345; 4,524,724; 4,589,373; 4,606,301; 4,610,221; 4,637,345; 4,790,264 and 4,896,629.

Other United States patents which illustrate the general state of the poultry watering art, as known to Applicant, include U.S. Pat. Nos. 4,221,188; 4,543,912; 4,669,422; 4,724,797; 4,770,126; 4,793,291; 4,884,528; 5,009,194; 5,016,574; 5,105,770; 5,136,982 and 5,136,983.

SUMMARY OF THE INVENTION

In one of its aspects, this invention provides a poultry watering valve requiring only a low toggle force for operation thereof, where the valve includes a body having a passageway therethrough with an inlet and an outlet end. The body has a step within the passageway and two preferably cylindrical regions of differing size located upstream of the step, with the smaller region being closer to the step and facing a passageway inlet. The valve includes operating means supported by the step and extending through the passageway beyond the passageway outlet.

Means are provided for closing the passageway. Such means are freely moveable within the preferably cylindrical region of greater size or diameter; at least a portion of such means is larger than the smaller, preferably cylindrical, passageway portion.

The valve further includes means for urging the closing means against a seat which preferably defines transition between the passageway portions of differing diameter. The valve operating means displaces the valve closing means from contact with the transition portion defining the seat and thereby opens the valve passageway upon displacement of the operating means by poultry.

In the preferred embodiment the valve operating member includes a head within the passageway supported by a shoulder within the passageway and a stem extending from the head through the passageway and beyond the outlet end of the valve. Most preferably, the valve closure means is provided by a ball which is freely moveable within the preferably cylindrical region of the passageway of greater size or diameter, with the ball having diameter greater than the smaller preferably cylindrical region of the passageway.

In the preferred embodiment, the means for urging the ball against the passageway wall seating portion defining transition between the passageway portions of differing diameter is provided by a rigid moveable biasing member which includes a head within the passageway supported by the ball and a stem extending from the biasing member head through the passageway towards the passageway inlet end.

In another of its aspects, this invention provides a low toggle force poultry watering valve which includes a valve body having a water passageway therethrough with inlet and outlet ends. A liner is within the valve body. The liner has a passageway therethrough coaxial with the valve body passageway and includes cylindrical regions which progressively decrease in diameter with downstream axial distance within the liner. The liner further preferably includes a transverse annular shoulder facing the inlet end with the smaller cylindrical region terminating at the shoulder. The liner preferably further includes a tapered region between the cylindrical regions of differing diameter with the tapered region defining a valve seat.

In this embodiment of the invention, a ball is freely moveable within the liner passageway region of larger diameter with the ball having diameter larger than the smaller diameter liner passageway portion.

A moveable valve operating member includes a head within the liner passageway and supported by the shoulder with the stem extending from the head through the liner passageway and the valve body passageway, beyond the valve body outlet end. Means are provided for urging the ball against the valve seat. The valve operating member head displaces the ball from contact with the seat upon lateral displacement of the stem by poultry.

In yet another of its aspects, this invention provides a liner for a low toggle force poultry watering valve having a water flow passageway therethrough. The liner preferably includes a radially-extending annular lip, cylindrical regions of progressively decreasing diameter with downstream distance through the liner, a frusto-conical region between the cylindrical regions which is adapted to define a valve seat and a transverse annular shoulder facing the liner inlet end, with the smaller cylindrical region terminating at the shoulder.

In still another of its aspects, this invention provides a liner for use in a low toggle force poultry watering valve having a water flow passageway therethrough, where the liner has a radially-extending annular lip, cylindrical regions of progressively decreasing diameter downstream of said lip, a frusto-conical region between the cylindrical regions which is adapted to define a valve seat and a transverse annular shoulder facing a liner inlet end. The smaller cylindrical region terminates at the shoulder. The liner is preferably made by deep draw progressive processing steps known in the eyelet industry.

The manufacturing process may initially involve puncturing a metal sheet to form a circular disk. The circular disk is then preferably progressively axially and radially deformed, preferably by repeatedly contacting one side of the disk, to conform the remaining disk side against dies of preselected shape. Such repeated contact conforms the disk so that both surfaces of the disk are concurrently formed progressively to final shape with a first side of the disk substantially, simultaneously forming the transverse annular shoulder, the smaller cylindrical region terminating at the shoulder, the frusto-conical region upstream of the smaller cylindrical region, the cylindrical region of greater diameter and the radially-extending lip. The insert manufacturing process preferably further includes punching a hole at the center of the deformed disk and trimming the disk periphery to a preselected contour.

In even another of its aspects, this invention provides a method for fabricating a liner for a low toggle force poultry watering valve which includes the steps of forming a metallic blank, progressively deforming the blank by contacting the blank against one or more dies of preselected shape so that respective blank surfaces are concurrently progressively formed to the final shape of the liner and, optionally, forming an aperture proximate the center of the deformed blank.

Figure 1:
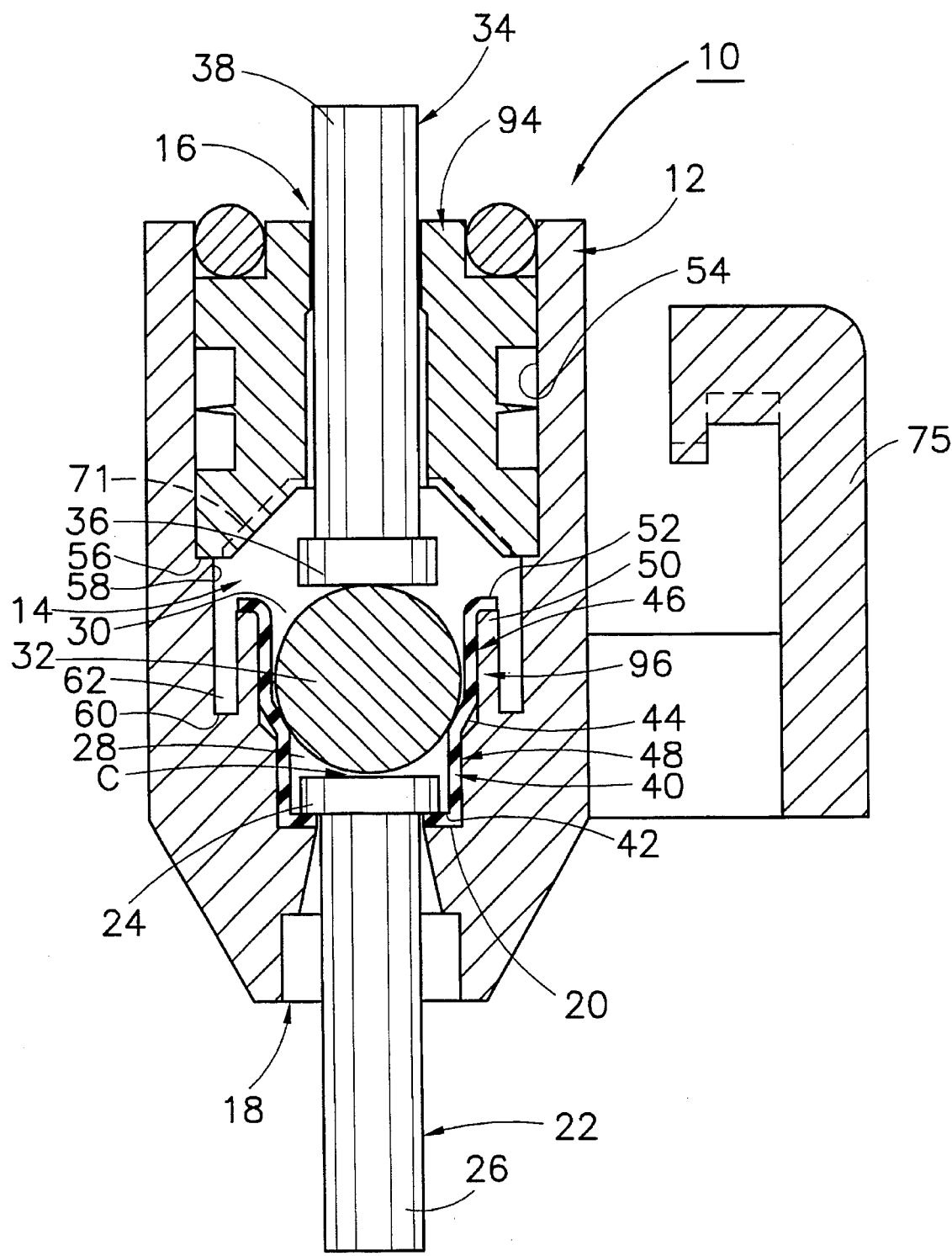
FIG. 1 is a partially sectioned elevation of a preferred embodiment of a low toggle force poultry watering valve manifesting aspects of the invention.

In the following description of the preferred embodiments of the invention, numerical indicators denote correspondingly numbered parts appearing in the drawings.

DESCRIPTION OF THE PREFERRED
EMBODIMENTS AND BEST MODE KNOWN
FOR PRACTICING THE INVENTION

FIG. 1 illustrates a preferred embodiment of a low toggle force poultry watering valve manifesting aspects of the invention. The poultry watering valve is designated generally 10 and includes a valve body 12 having a water passageway therethrough designated generally 14. Valve body 12 has inlet and outlet ends respectively designated 16, 18 and a transverse annular shoulder 20 within passageway 14. Shoulder 20 faces inlet 16.

Valve 10 includes a moveable valve operating member 22 which consists of a head 24 and a stem 26 extending from head 24. Head portion 24 of valve operating member 22 is within passageway 14 and is supported, at least indirectly, by shoulder 20. Stem 26 extending from head 24 extends through the portion of passageway 14 which is downstream of shoulder 20, beyond outlet end 18 of passageway 14 in valve body 12.

Passageway 14 includes two regions of differing transverse cross-sectional size upstream of the shoulder 20. These regions of differing size are preferably of differing diameter and are indicated as 28, 30 with region 28 of lesser diameter being closer to shoulder 20 than is region 30 of greater diameter. While regions 28, 30 are preferably cylindrical, this is not required.

Valve 10 further includes a closing member, preferably but not necessarily in the shape of a ball 32, which is freely moveable within preferably cylindrical region 30 of greater diameter. Ball 32 has diameter greater than the diameter of preferably cylindrical passageway portion 28. As a result, ball 32 is freely moveable within cylindrical passageway region 30 of greater diameter but ball 32 is incapable of fully entering smaller preferably cylindrical passageway region 28 of lesser diameter.

Valve 10 may further include means for urging ball 32 towards and preferably against a passageway wall seating portion defining transition between the passageway portions of differing diameter. In the embodiment illustrated in FIG. 1, the ball urging means is provided in the form of flow restricting pin 34 which includes a head 36 and a stem 38. While head 36 of flow restricting pin 34 bears downwardly on ball 32 due to the weight of pin 34 and thereby serves to urge ball 32 downwardly against a seating portion of the passageway wall, this function is purely ancillary to the principal function of flow restricting pin 34, which is to restrict flow of water downwardly into the valve between the axially extending cylindrical surfaces of flow restricting pin 34 and the valve housing at inlet end 16.

While the principal function of the flow restricting pin is to restrict the flow of water downwardly into the passageway 14 of the valve, water flow restriction through the valve and out the outlet end 18 is also controlled by the valve closure means or ball 32. Still referring to FIG. 1, the downward flow of water through the valve is also limited by the clearance between the ball 32 and the cylindrical region 30 of greater diameter. Relative to the flow restricting pin 34, the reduction in fluid flow area through the passageway 14, as defined by the clearance between the ball and the cylindrical region 30 of greater diamenter, provides approximately 25% of the fluid flow restriction, while the flow restricting pin 34 provides approximately 75% of the fluid flow restriction from the inlet to the outlet of the valve. The combined fluid flow restriction of the ball 32 and the flow restricting pin 34 defines a first stage of fluid flow or first fluid flow rate.

Figure 5:
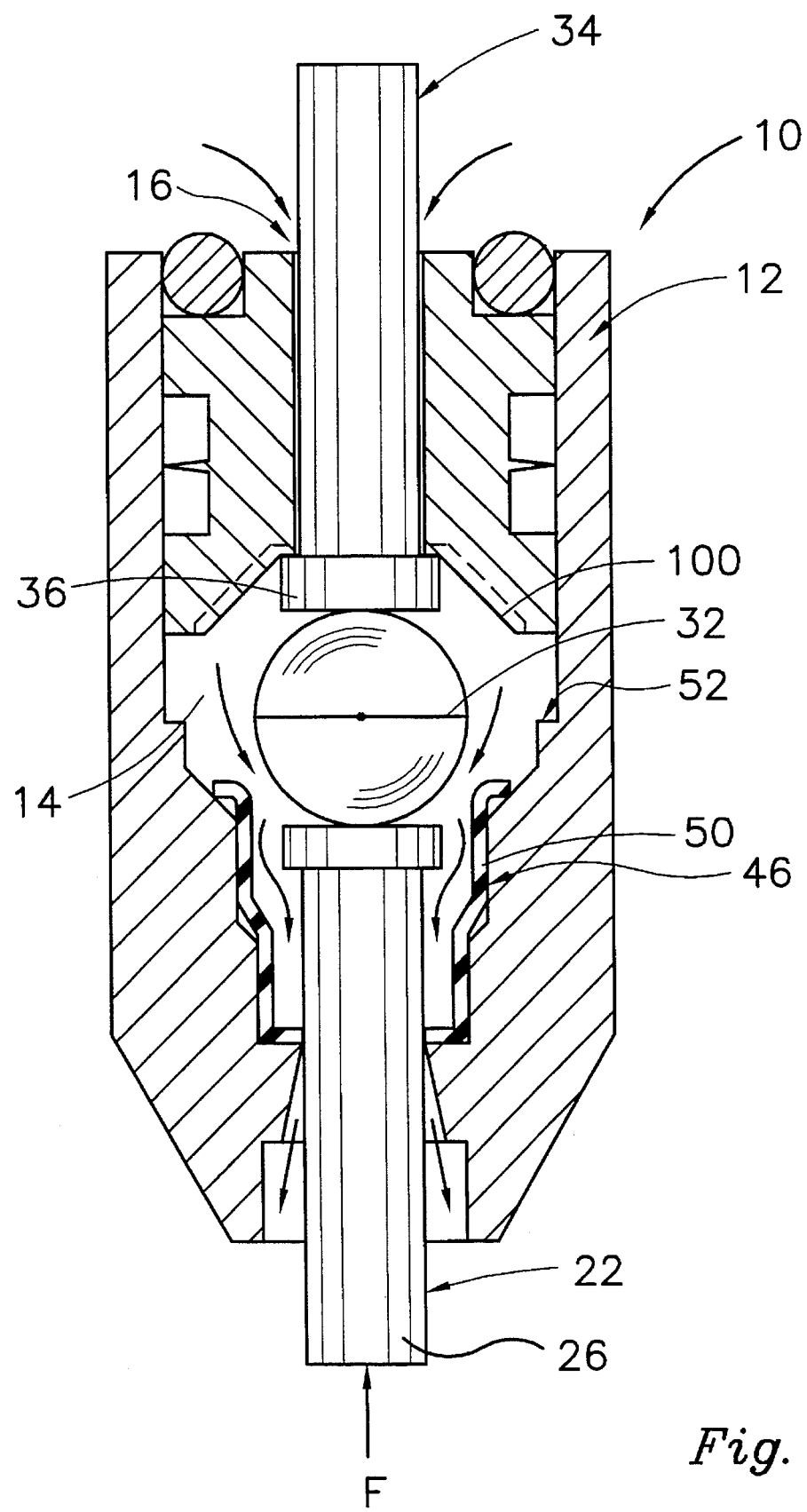
FIG. 5 is the low toggle force poultry watering valve of FIG. 1 shown in the second stage operating position.

Further, as described below, the valve closure means or ball 32 may be displaced vertically along the axis of the passageway to a vertical location wherein the center or horizontal diameter of the ball 32, as seen in FIG. 5, is beyond or above the radially extending annular lip 52. In this position, the clearance between the ball 32 and the liner becomes excessively large and no longer operates as a fluid flow restriction causing the valve to operate at a second stage or second fluid flow rate greater than the first fluid flow rate.

For manufacturing economies, flow restricting pin 34 is preferably identical with operating member 22. Most preferably, respective stems 26, 38 of operating member 22 and flow restricting pin 34 are both cylindrical and of the same diameter and length. Further most preferably, respective heads 24 and 36 of operating member 22 and flow restricting pin 34 are preferably cylindrical and of the same diameter and axial lengths.

Flow restricting pin 34 fits within an axially extending bore within an insert member 94 residing within the upper portion of valve body 12. Close dimensioning between the cylindrical stem of flow restricting pin 34 and the axial passageway or bore through insert member 94 as evidenced at inlet end 16 of water passageway 14 controls the flow of water and permits only the proper amount of water to enter into the valve passageway. Tolerances between the cylindrical stem of flow restricting pin 34 and the passageway through insert member 94 are on the order of ten-thousandths of an inch, i.e. 0.0001. These close tolerances are selected to allow just the right amount of water to enter the valve when the valve is opened by a bird toggling lower pin 26. Of course, when the valve is closed and the ball 32 is resident against a corresponding seat, water pressure pressing on the ball from above maintains the valve in a closed disposition.

When the valve has been opened by a bird toggling lower pin 26 and thereby displacing ball 32 upwardly from its seat, water comes out of the valve almost, but not quite, as a steady stream; this is the rate at which the water can be ingested by a bird. Typically pressure in the water supply line above flow restricting pin 34 is adjusted depending on the age of the birds drinking from the relevant valves.

While flow restricting pin 34 has been illustrated as including both a head portion and a cylindrical stem portion, it is to be understood that it is not necessary to include such a head portion illustrated as 36 in FIG. 1. Flow restricting pin 34 can be a single uniform diameter pin, of rod-like configuration.

Valve 10 in the embodiment illustrated in FIG. 1 further preferably includes a liner 40 within body 12, with liner 40 having an axial passageway extending there through in coaxial fashion with and forming a part of water passageway 14, which extends through valve body 12 and valve 10 in general. Liner 40 includes a shoulder 42 facing inlet end 16 of valve 10. Shoulder 42 is preferably annular and transverse to the axis of the passageway through liner 40. A seat 44 is formed in a longitudinally extending wall portion 46 of liner 40.

The portion of liner 40 extending axially from annular shoulder 42 is designated 48 and is preferably cylindrical. Seat 44 of liner 40 is defined by a portion of axially extending wall 46 which is disposed angularly to the axial direction to define a frustro-conical portion of liner 40. Proceeding towards inlet end 16 from portion 44, axially extending wall 46 again defines a cylindrical portion, this time of larger diameter than cylindrical portion 48; this larger diameter portion is designated 50. An end portion of liner 40 axially remote from annular shoulder 42 is formed as a radially extending annular lip 52.

In the embodiment of the low toggle force poultry watering valve illustrated in FIG. 1, valve body 12 at the region of inlet end 16 has a hollow, preferably cylindrical, interior defined by a cylindrical bore forming an inwardly facing annular cylindrical surface 54, which terminates at a step 56.

Downstream of step 56, the interior surface of valve body 12 is again preferably cylindrical and is designated 58. Preferably cylindrical surface 58 extends axially from step 56 and terminates at an annular surface 60 defining the bottom of an annular cavity 62 in valve body 12. Cavity 62 is in fluid communication with water passageway 14.

Figure 2:
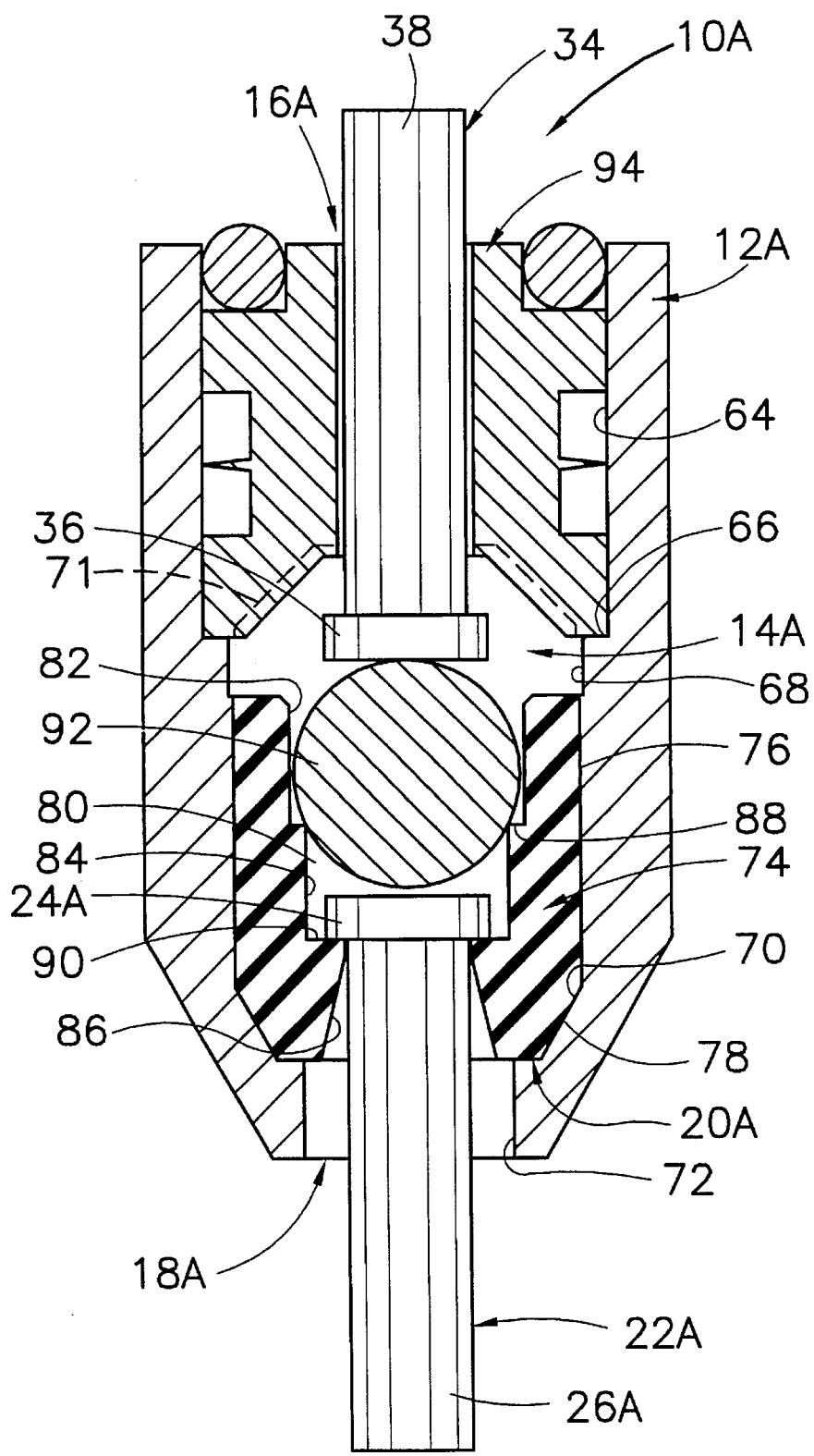
FIG. 2 is a partially sectioned elevation of an alternate, equally preferred embodiment of a low toggle force poultry watering valve manifesting aspects of the invention.
Figure 3:
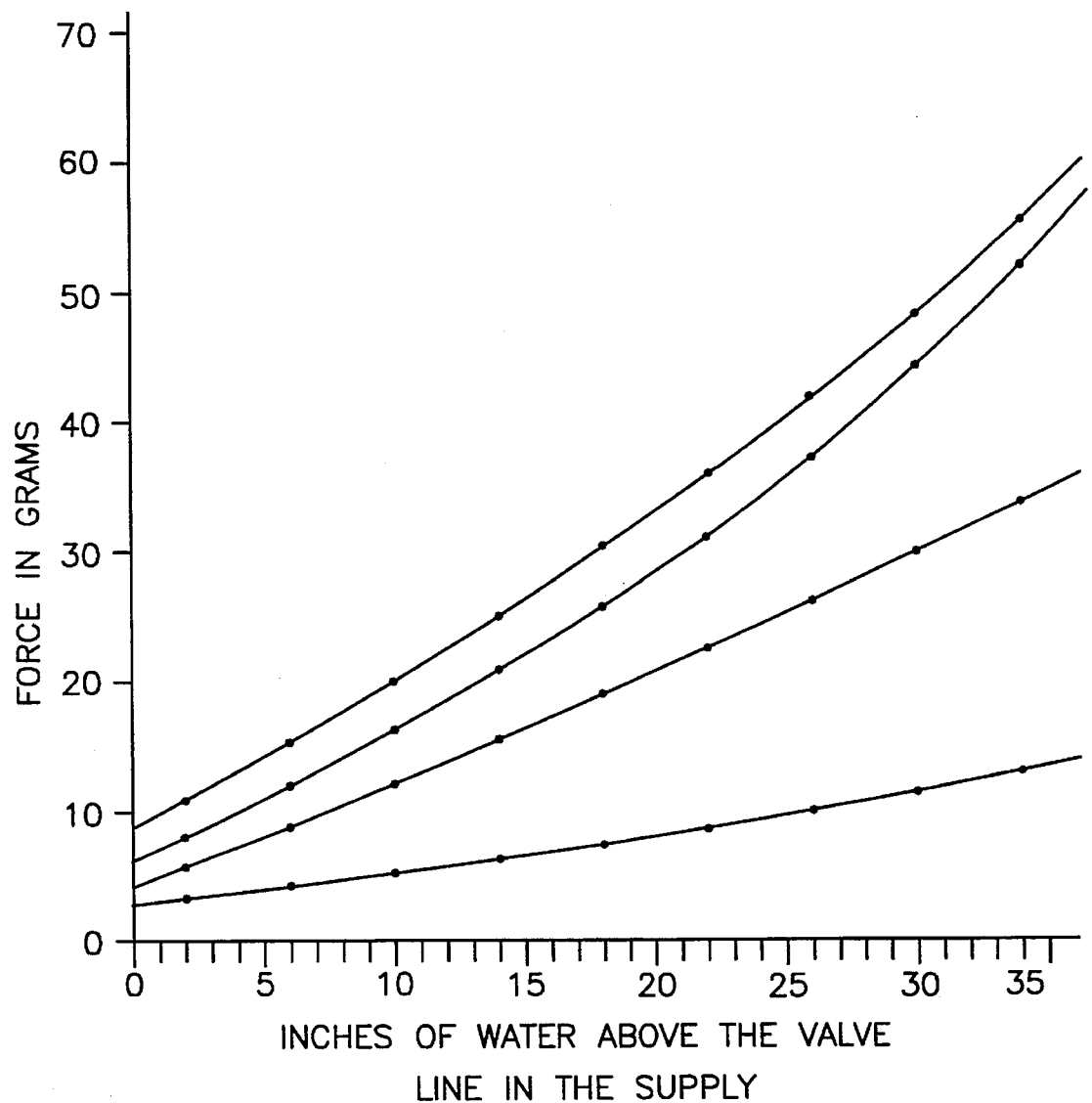
FIG. 3 is a schematic representation of a process for fabricating a liner for use in a low toggle force poultry watering valve, manifesting aspects of the invention.
Figure 4:
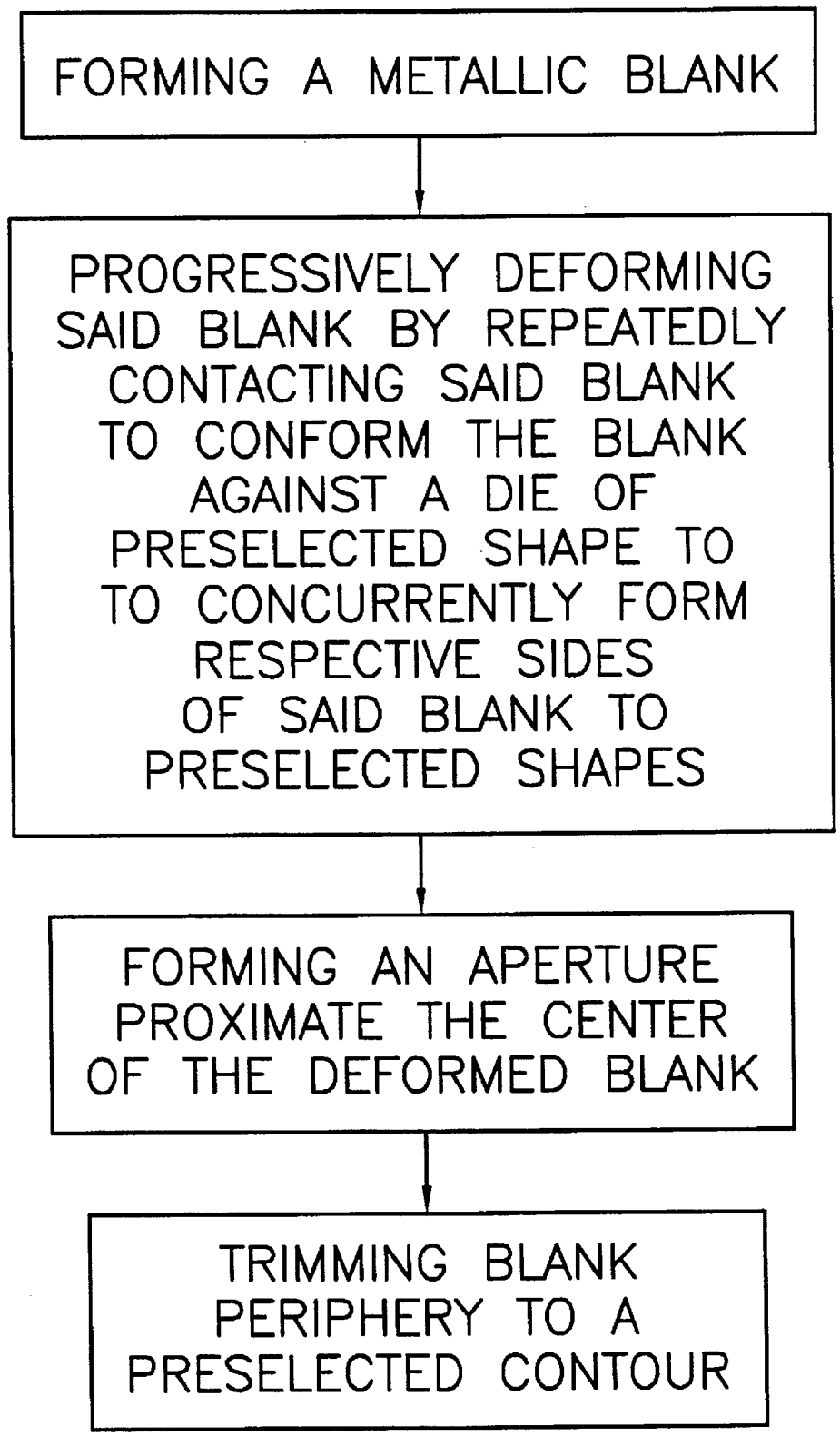
FIG. 4 is a graphic comparison of force required to toggle a poultry watering valve according to the invention as compared with prior art poultry watering valves.

FIG. 2 illustrates an alternate but equally preferred embodiment of a low toggle force poultry watering valve manifesting aspects of the invention. The valve is generally designated 10a and includes a valve body 12a having a water passageway 14a extending therethrough, with inlet end 16a and outlet end 18a located at respective axial extremities of valve body 12a. Located closer to outlet end 18a than to inlet end 16a but facing inlet end 16a is a shoulder 20a of valve body 12a. Shoulder 20a is preferably an annular planar surface oriented perpendicularly to the axis of valve body 12a and preferably supports, at least indirectly, a moveable valve operating member 22a which includes a head 24a and a stem 26a.

Valve body 12a is fabricated with a hollow interior. Proceeding from inlet end 16a towards outlet end 18a, inner surface 64 of valve body 12a is cylindrical and axially elongated. Surface 64 terminates at an annular step 66. Downstream of step 66 a second inner surface 68 of valve body 12a is again axially elongated and cylindrical, defining a cylinder of lesser diameter than inner surface 64. Further downstream towards outlet end 18a the interior surface of valve body 12a slants inwardly from second inner surface 68 to define a frusto-conical surface 70 extending downstream to a shoulder 20a. The most downstream portion of passageway 14a defined by the inner surface of body 12a is a cylindrical bore 72 extending from shoulder 20a to outlet end 18.

The embodiment of valve 10a illustrated in FIG. 2 further includes an insert 74 which is preferably machined and positioned within valve body 12a in close fitting, complemental contact with shoulder 20a, frusto-conical surface 70 and second inner cylindrical surface 68 of valve body 12a. Insert 74 has a preferably cylindrical axially elongated exterior surface 76 and a tapered axially elongated surface 78. Surfaces 76 and 78 of insert 74 are sized and shaped to fit complementally, in water tight sealing engagement, with respective interior surfaces 68, 70 of valve body 12a.

Insert 74 has an axially elongated passageway 80 extending therethrough. Passageway 80 forms a part of passageway 14a when insert 74 is within valve body 12a, as illustrated in FIG. 2.

Axially elongated passageway 80 is defined by a first cylindrical inner surface 82, a second cylindrical inner surface 84 and a frustro-conical inner surface 86 of insert 74. First and second cylindrical inner surfaces 82, 84 are connected by a shoulder 88 while second cylindrical inner surface 84 and frusto-conical inner surface 86 are connected by a shoulder 90. Preferably both shoulder 88 and shoulder 90 are annular, transverse to the common axis of valve body 12a and insert 74 and face inlet end 16a when insert 74 is in valve body 16a as illustrated in FIG. 2.

Closure means for valve 10a is provided by a ball 92 which is moveable within at least a portion of water passageway 14a. Ball 92 preferably has diameter slightly less than the inner diameter of insert 74 in the region defined by first cylindrical inner surface 82. Ball 92 preferably has diameter slightly larger than the inner diameter of insert 74 in the region defined by second cylindrical inner surface 84. As the result, ball 92 can move freely axially within the region of passageway 80 defined by cylindrical inner surface 82 until ball 92 contacts transverse shoulder 88. Since ball 92 has diameter larger than the inner diameter of shoulder 88, ball 92 interferes with the inner edge of shoulder 88. As a result, the vertex defining juncture of shoulder 88 with cylindrical inner surface 84 becomes a seat for the valve closure member defined by ball 92, as illustrated in FIG. 2. The vertex has not been numbered in FIG. 2 to aid drawing clarity.

Similarly to the embodiment illustrated in FIG. 1, valve 10a includes a flow restricting pin 34 which may have a head portion 36 and a cylindrical portion 38 and which fits within insert member 94. The principal function of flow restricting pin 34 is, as explained above, to regulate the flow of water into the valve when the valve is opened as a result of ball 92 having been displaced by a bird having toggled valve operating member 22A. Ancillary to this function, flow restricting pin 34 further serves as means for urging the valve closure means defined by ball 92 against the valve annular seat defined by the unnumbered vertex defined by the juncture of shoulder 88 with second cylindrical inner surface 84.

In the illustrated embodiments of the invention, it is preferable to use a ¼ inch diameter ball as ball 92 or 32. At the present time, industry standard practice is to use a ball of 7⁄16 inch diameter. Applicant has found that use of a smaller ball yields an easier toggle force thereby facilitating operation of the valve by poultry.

While known poultry watering valves which use the industry standard 7⁄16 inch diameter ball have typically used valve seats on the order of 0.280 inches in diameter. However, the valve seat against which ball 32 or 92 rests is preferably 0.226 inches in diameter in accordance with this invention. This diameter attributes to the minimal effective toggle force required of a bird in actuating valve operating member 26 or 26a.

The valve construction according to the invention results in a two-stage metering valve with the particular stage being controlled by the ball position within the passageway as illustrated in FIGS. 1 and 5. Specifically, it is to be understood that poultry can exert a force "F" on the valve operating member 26 and lift the member 26 or 26a straight up, thereby displacing ball 32 or 92 from a region in which the passageway through the valve is of relatively smaller diameter, as seen in FIG. 1, to a region where the water passageway through the valve is of relatively greater diameter respecting the diameter of ball 32 or 92, as seen in FIG. 5. Of course, when the ball 32 or 92 reaches the valve passageway of relatively greater diameter, increased water flow through the valve results.

Vertical displacement of the ball is limited by the action path of the flow restricting pin. As seen in FIG. 5, upon vertical displacement, the head 36 of the flow restricting pin eventually contacts the frustro-conical section of the insert 94, thereby limiting the path of travel of the flow restriction pin 34. This limitation also restricts the vertical displacement of the ball 32. However, in this position of maximum vertical displacement, the clearance, between the ball 32 and the start of the champher on the radially extending annular lip, becomes excessively large and no longer operates as a fluid flow restriction, thereby causing the valve to operate at its second stage or second fluid flow rate greater than the first fluid flow rate.

When the flow restricting pin is in this position of maximum vertical displacement, fluid flow is channeled through grooves 71 since the fluid flow path between the stem of the flow restricting pin and the inlet passage 16 becomes blocked by the flow restricting pin head 36.

The cylindrical shape of the water flow passageway immediately upstream of valve outlet end 18 in combination with water surface tension serves to retain water within this cylindrical portion of the water passageway, making it easy for a chick or other young bird to obtain just a droplet of water. The cylindrical portion of the water flow passageway immediately upstream of outlet end 18 is sometimes referred to as a "drinking cavity".

When water flows through the valve, most of the flow restriction of the water stream occurs at the flow restricting pin 34 or 34a. Specifically, it is believed that about ¾ of the restriction occurs at the flow restricting pin and only about 25% of the restriction occurs in the neighborhood of the ball 32 or 92. Since the valve according to the invention provides only approximately 25% of the flow restriction in the neighborhood of ball 32 or 92 results in a valve which is more immune to the effects of wear than known, competitive valves. In this regard, it is to be understood that the valves according to the invention have shifted all significant flow restriction away from moveable valve operating member 22 which increases valve life since valve wear is substantially greater between moving parts which are closer to the poultry as opposed to moving parts which are remote from the poultry.

The cylindrical shape of the valve body immediately inboard of outlet end 18 or 18a as embodied by cylindrical surface 72 makes the valve body substantially easier to machine with cylindrical surface 72 being relatively short in the axial direction at the end of the conical section which is numbered 86 in FIG. 2 and which is unnumbered in FIG. 1. In that regard, it is to be understood that it is the transition from the frustro-conical surface to a cylindrical surface terminating at valve passageway outlet end 18 or 18a which produces the drinking cavity noted above.

Further respecting valve body 12 in the configuration illustrated in FIG. 1, a portion of valve body 12 which separates angular cavity 62 from the main water flow passageway is a cylindrical ridge or lip and has been designated generally 96 in FIG. 1. Cylindrical lip 96 must flex slightly in the transverse direction to facilitate an interference fit with liner 40 in a manner that there is no distortion of liner 40 in order to maintain the correct geometric configuration between ball 32 and the portion of liner 40 which ball 32 contacts. In this regard, it is to be noted that while there is a tight fit which might be characterized as an interference fit between the portion of liner 40 at indicated by 46 and lip 96, there is no interference at the area of liner 40 designated 44 so that there is not deformation of liner 40 at this area.

An important aspect of this invention lies in the revision of a liner 40 which can be manufactured by a drawing or forming process thereby permitting volume manufacture of such liner parts at a cost much less than the cost associated with a machined part such as insert 74 which is the counterpart of liner 40 in the embodiment illustrated in FIG. 2. Liner 40 in its most general form has regions of differing diameter together with the transition region separating such differing diameter region with the transition region defining a valve seat. A liner is preferably formed by progressively deforming a metal blank by contacting the blank against forming surfaces of preselected shapes so that the blank surface is formed to the desired shape of the liner.

Referring to the embodiment of the valve illustrated in FIG. 2, the ¼ inch diameter ball 92 rests on a shoulder whose inner edges are defined by the small inner diameter 84 of insert 74. Preferably, when ball 92 is ¼ inch in diameter, diameter of the smaller cylindrical portion 84 is 0.226 inches. Further preferably, when a valve according to the embodiment illustrated in FIG. 2 is fabricated, the insert 74 and specifically the edge of shoulder 88 on which ball 92 rests is "coined" so that the actual seat against which the ball rests is a little larger than 0.226 inches as a result of the coining operation. Coining is desirable to conform the edge to the shape of the ball and thereby provide a good seal at the ball-shoulder interface.

Similarly, referring to the embodiment of the valve illustrated in FIG. 1, it is preferred that the inner diameter of liner 40 measured at the axial midpoint of angularly disposed seat portion 44 is 0.226 inches. Liner 44 is further constructed desirably to have an inner diameter of 0.210 inches in the region of head 24 of the lower pin 22.

The combination of several important design parameters in the valve of the present invention enable the valve to be toggled with a force four (4) to six (6) times less than the force required to toggle valves existing in the prior art.

The valve of the present invention utilizes a valve closure seat which is significantly smaller than prior art valves. Since the valve closure seat is smaller, the resistive force or pressure exerted on the ball by the water column above the ball is significantly reduced. Comparing prior art valves typically utilizing a valve closure ball of approximately 0.4375 inches in diameter and a valve seat on the order of 0.280 inches in diameter, the valve of the present invention utilizes a valve closure ball of approximately 0.25 inches in diameter and a valve seat on the order of approximately 0.226 inches. This reduction in ball and seat size singularly results in an approximately 1.53:1 reduction in the toggle force.

Figure 6:
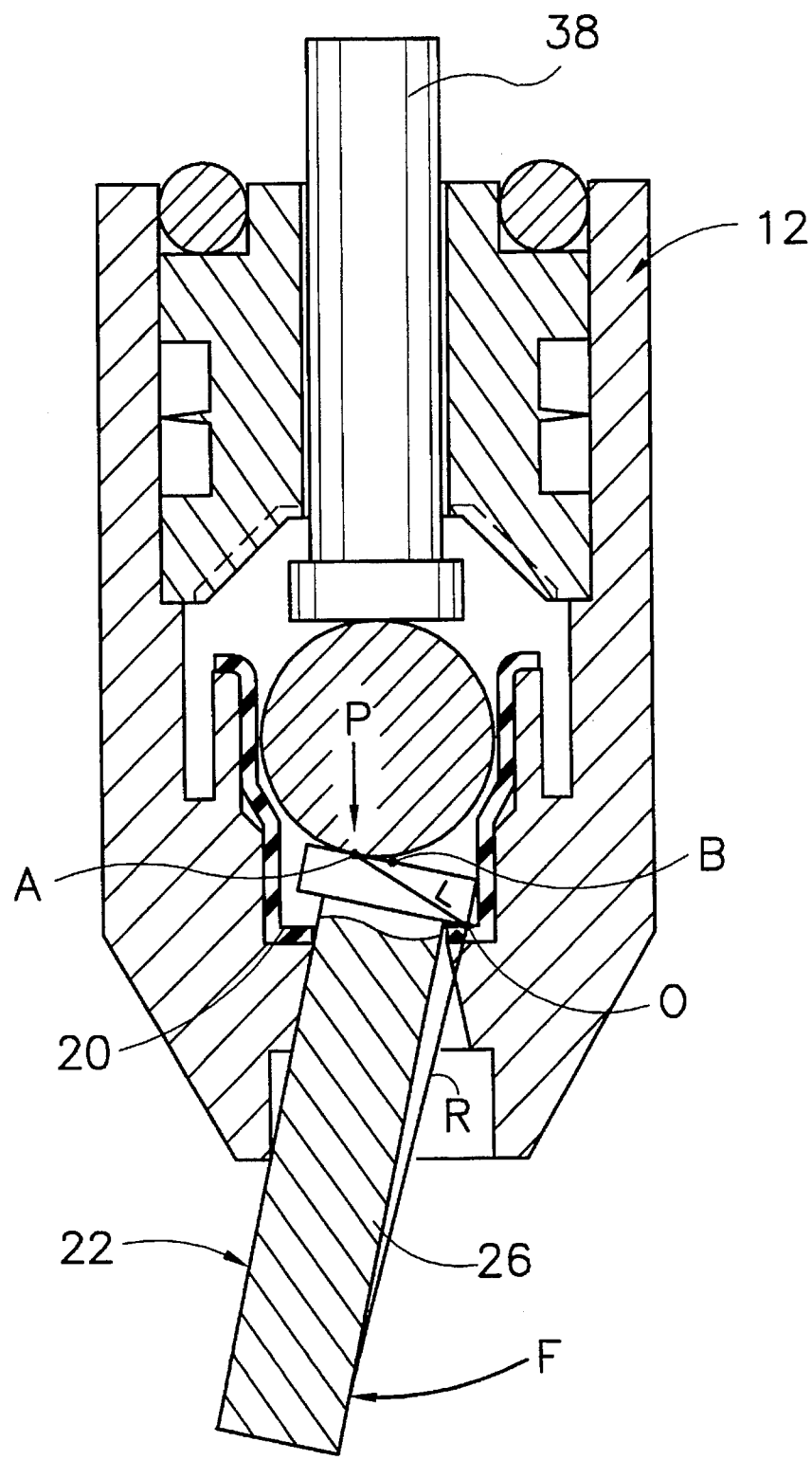
FIG. 6 is the low toggle force poultry watering valve of FIG. 1 shown in the first stage operating position.

The dimensions of the head 24 of the valve operating member 22 also significantly reduce the toggle force. Referring to FIG. 6, upon application of a toggling force "F", the valve operating member pivots about a point "O" causing the head of the member to contact and exert a vertical displacement force on the ball. Examining the moments around the point "O", one way to minimize the toggling force "F" is to minimize the length of the moment arm "L". The valve of the present invention minimizes "L" by utilizing a valve head which is not only smaller in diameter, but also smaller in axial length compared to the prior art. The axial length and diameter of the valve head 24 of the present invention are 0.050 inches and 0.178 inches, respectively, compared to the prior art wherein the axial length and diameter of the valve head is typically about 0.100 inches and 0.220 inches, respectively. The reduction in overall valve head size results in an approximately 2:1 reduction in the toggle force.

The reduced clearance between the seated ball 32 and the valve head 24 of the present invention, depicted by letter "C" in FIG. 1, also significantly reduces the toggle force.

From FIG. 6, it can be appreciated that increased clearance between the ball 32 in the seated position and the valve head 24 lengthens the moment arm, depicted by the letter "L", since upon rotation, the valve head will initially contact the ball at a point, for example point "A", far from the pivot point "O". As discussed above, it is desired to minimize the moment arm "L" in order to minimize the toggle force. The valve of the present invention minimizes the clearance between the seated ball 32 and the valve head 24, thereby causing the valve head to initially contact the ball at point closer to the pivot point, for example point "B" as seen on FIG. 6, and thereby minimizing the toggle force. Preferably the clearance between the seated ball and the valve head is approximately 0.010 inches.

The increased clearance between the stem of the valve operating member and the outlet end 18 of the valve further reduces the toggle force. In prior art valves, small clearances between the stem and the outlet cause the pivot point "O" to slide along the shoulder 20 upon rotation of the valve operating member by a toggling force. This transverse sliding action creates friction which not only causes the valve member to wear prematurely, but also causes a force resistant to rotation of the valve member. By maximizing the clearance between the stem of the valve operating member and the outlet end of the passageway of the valve body, the aforementioned transverse sliding action is minimized; valve component wear and forces resistant to rotation of the valve member are correspondingly reduced. Preferably the clearance between the stem of the valve operating member and the outlet end of the passageway of the valve is approximately 0.010 inches.

Figure 7:
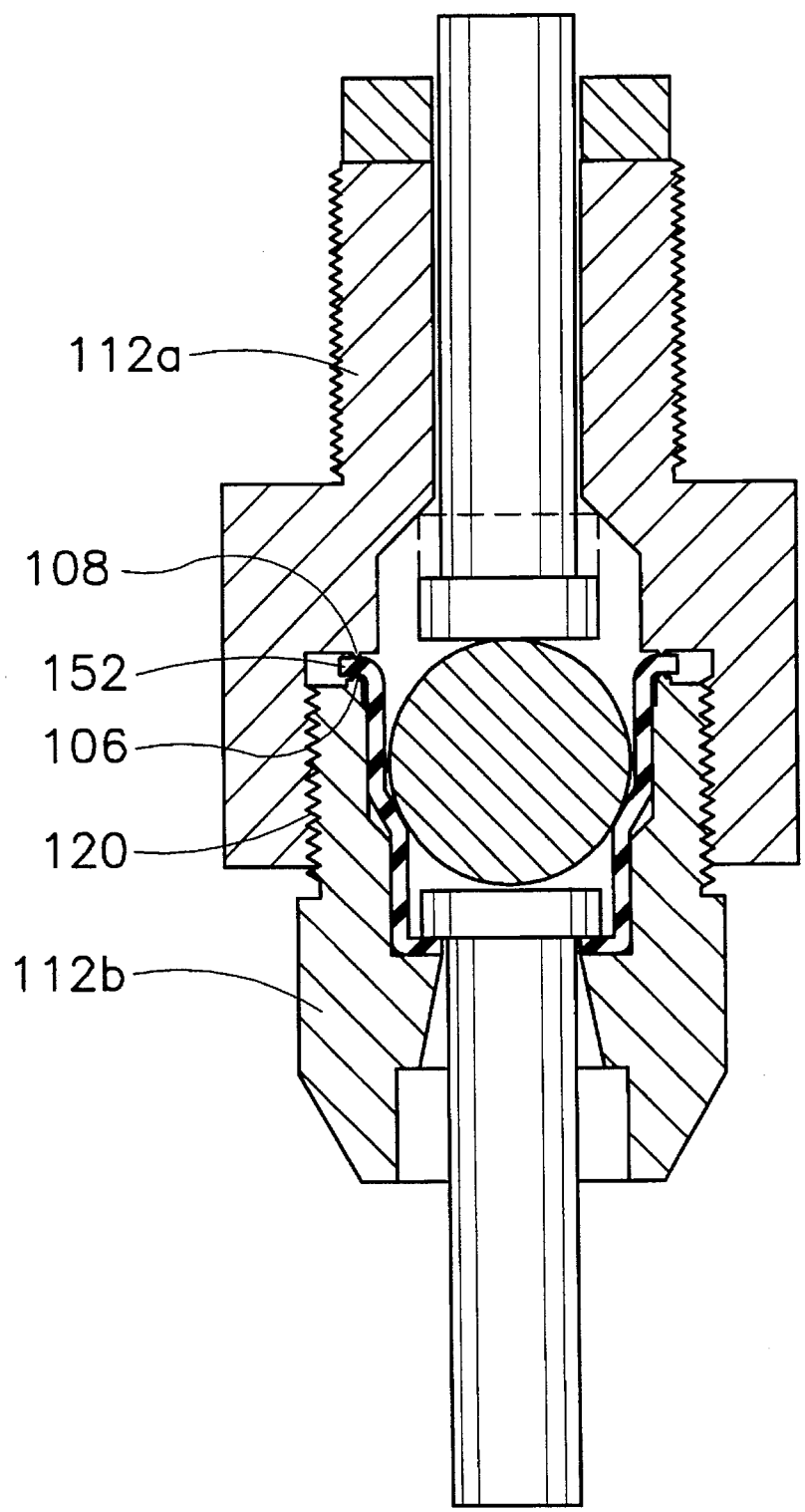
FIG. 7 is a partially sectioned elevation of a further embodiment of a low toggle force poultry watering valve manifesting aspects of the invention.
Figure 8:
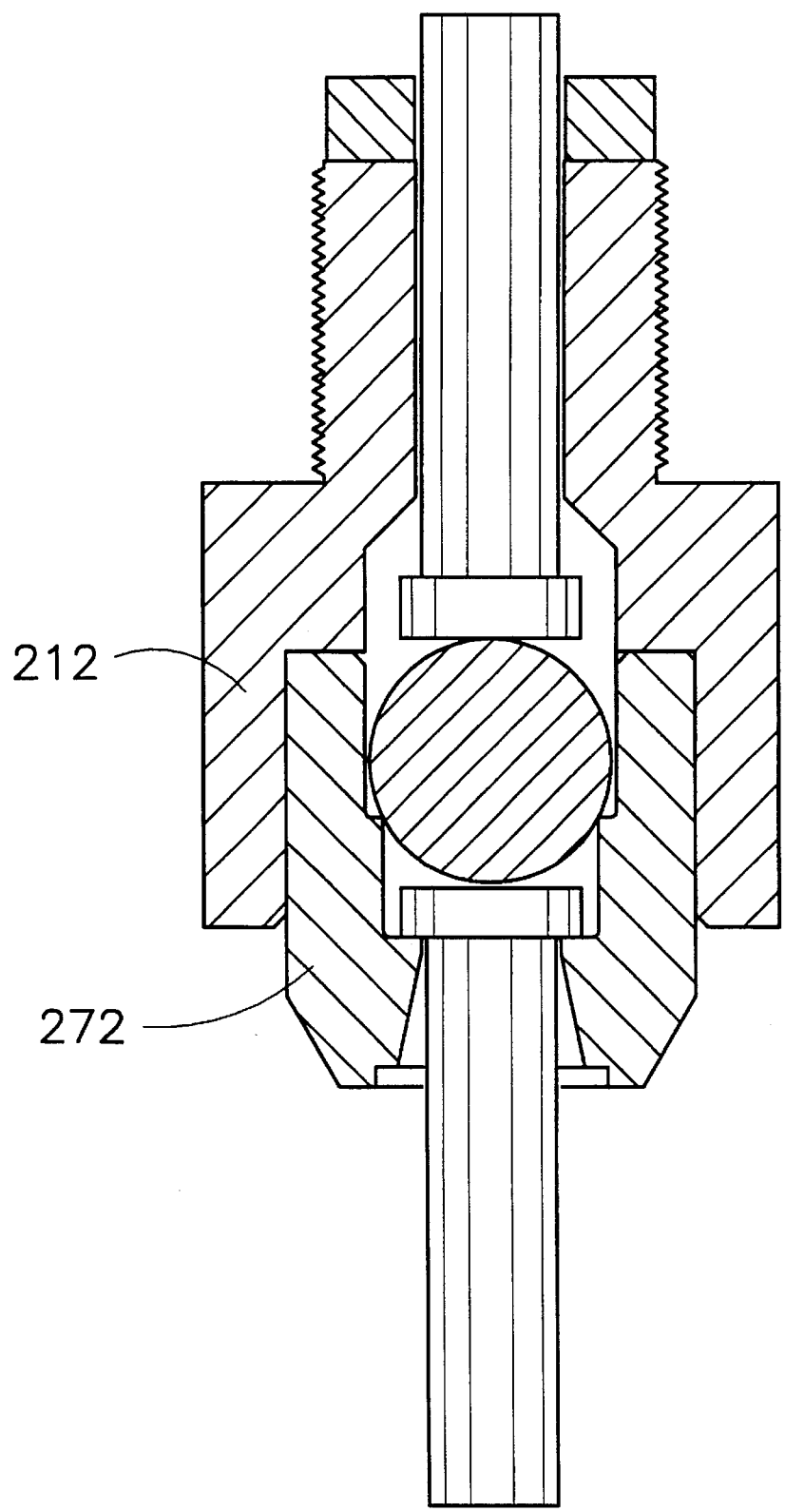
FIG. 8 is a partially sectioned elevation of yet another equally preferred embodiment of a low toggle force poultry watering valve manifesting aspects of the invention.

FIGS. 7 and 8 illustrate further embodiments of the present invention in which the upper portion of the valve body is threaded to provide an alternative means for installing the valve in a standard fluid pipe as compared to the J-lock 75 illustrated in FIG. 1. The embodiments illustrated in FIG. 7 also illustrates an alternative means of affixing the liner in the valve body. In this embodiment, the radially extending lip 152 is pinched between contact points 106 and 108 on opposed portions of the valve body. The valve body 112 in this embodiment is formed of two components 112*a* and 112*b* which are provided with corresponding mating thread 120 to connect the valve body and pinch the radially extending lip upon assembly.

FIG. 8 illustrates an alternative embodiment in which the insert 74 of the embodiment illustrated in FIG. 2 can be assembled from the underside or bottom of the valve body.

Figure 9:
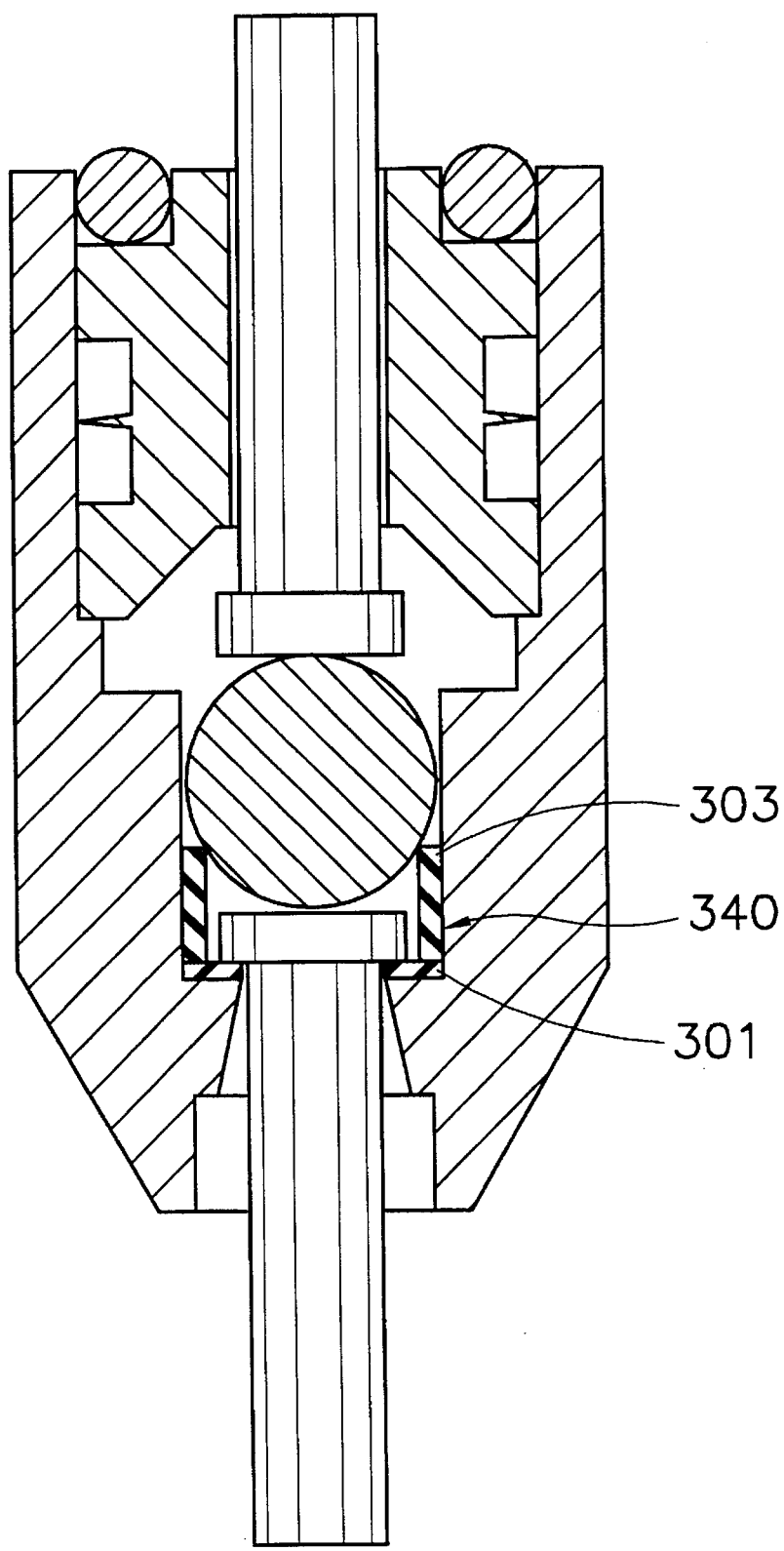
FIG. 9 is a partially sectioned elevation of still another equally preferred embodiment of a low toggle force poultry watering valve manifesting aspects of the invention.

FIG. 9 illustrates yet another alternative embodiment in which the liner 340 is modified and comprises two separate components which are easier and less expensive to manufacture than the liner 40 described above and illustrated in FIG. 1. Preferably the liner 340 comprises a cylindrical, flat washer 301 and a section of cut tubing 303 which secures the washer 301 in the position as shown.

While the preferred embodiment of the invention has been described above and alternative embodiments have also been described, the scope of protection to which the invention is believed entitled is defined by the claims and by equivalents thereto which perform substantially the same function in substantially the same way to achieve substantially the same result as set forth in the claims, so long as such substantial equivalents, as defined by a claim for such substantial equivalent, do not read on the prior art.

I claim the following:

1. A low toggle force poultry watering valve comprising:
   a. a valve body assembly having a passageway therethrough defining inlet and outlet ends, including a transverse annular shoulder within said passageway facing said inlet end;

b. a movable valve operating member including:
   i. a head within said passageway facing said inlet end and supported by said shoulder; and
   ii. a stem extending from said head through said passageway and beyond said outlet end;

c. said passageway having cylindrical regions of differing diameter upstream of said shoulder, a region of lesser diameter being closer to said shoulder said passageway between said cylindrical regions of differing diameter defining a transition portion;

d. a ball freely movable within said cylindrical region of greater diameter, said ball having diameter greater than said lesser diameter cylindrical passageway portion; and e. means for urging said ball towards said lesser diameter cylindrical passageway portion;

f. whereby said valve operating member head said valve by displacing said ball from said lesser diameter cylindrical passageway portion towards said inlet end upon lateral displacement of said stem by poultry;

wherein said urging means further comprises a movable biasing member including:
   i. a head within said passageway and supported by said ball;
   ii. a stem extending from said biasing member head through said passageway towards said inlet end;

wherein said passageway is cylindrical immediately adjacent said outlet end and frusto-conical adjoining said cylindrical portion adjacent said outlet end.

2. A low toggle force poultry watering valve comprising:

a. a valve body having a passageway therethrough with inlet and outlet ends and including an axially projecting annular ring outboard of said liner, spaced radially inwardly from said valve body wall thereat to define an annular void between said valve body wall and said liner, said annular void being in fluid communication with said passageway;

b. liner within said body, having a passageway therethrough coaxial with said valve body passageway including cylindrical regions of progressively downstream decreasing diameter;
   i. said liner including a transverse annular shoulder facing said inlet end, said smaller cylindrical region terminating at said shoulder; and
   ii. a liner tapered region between said cylindrical regions of decreasing diameter defining a valve seat;

c. a ball freely movable within said liner passageway region of larger diameter, said ball having diameter larger than said smaller diameter passageway portion;

d. a movable valve operating member including:
   i. a head within said passageway and supported by said shoulder; and
   ii. a stem extending from said head through said passageway and beyond said outlet end; and e. means for urging said ball against said valve seat; and f. said valve operating member head displacing said ball from contact with said seat upon lateral displacement of said stem by poultry.

3. The valve of claim 2 wherein said annular void extends axially substantially along said cylindrical region of largest diameter.

4. The valve of claim 3 wherein said annular void is outboard of said tapered region of said liner.

5. A liner, for a low toggle force poultry watering valve, having a water flow passageway therethrough, including:

a. cylindrical regions of progressively decreasing diameter;

b. a frusto-conical region between said cylindrical regions adapted to define a valve seat;

c. a transverse annular interior shoulder defining a liner outlet end; and d. said smaller cylindrical region terminating at said shoulder;

whereby said liner is made according to a process comprising the steps of:
   i. forming a circular metallic disk;
   ii. progressively axially and radially deforming said disk by contacting said disk to conform the disk against a die of preselected shape by progressively forming:
     (a) said smaller cylindrical region terminating at said shoulder; and then
     (b) said frusto-conical region upstream of said smaller cylindrical region; and then
     (c) said cylindrical region of greater diameter; and then
     (d) said radially extending annular lip;
   iii. making a hole proximate the center of the deformed disk; and
   iv. trimming any remaining disk periphery to a preselected contour.

6. A liner, for a low toggle force poultry watering valve, having a water flow passageway therethrough, including:

a. regions of differing diameter; and b. a transition region between said differing diameter regions defining a valve seat;

whereby said liner is made according to a method comprising:

c. progressively deforming a metallic blank by contacting said blank against forming surfaces of preselected shape so that blank surfaces are progressively formed to the shape of said liner.

7. A method for fabricating a liner for a low toggle force poultry watering valve, comprising progressively deforming a metallic disk by contacting said disk against a die of preselected shape so that disk surfaces are concurrently progressively formed to the final shape of said liner.

\* \* \* \* \*